(12) United States Patent
Kieffer (10) Patent No.: US 11,456,570 B2
(45) Date of Patent: Sep. 27, 2022

(54) METHOD AND SYSTEM FOR MEASUREMENT OF ULTRA-HIGH LASER INTENSITY

(71) Applicant: Institut National de la Recherche Scientifique, Quebec (CA)

(72) Inventor: Jean-Claude Kieffer, Montreal (CA)

(73) Assignee: INSTITUT NATIONAL DE LA RECHERCHE SCIENTIFIQUE

( * ) Notice: Subject to any disclaimer, the term of this patent is extended or adjusted under 35 U.S.C. 154(b) by 291 days.

(21) Appl. No.: 16/925,003

(22) Filed: Jul. 9, 2020

(65) Prior Publication Data

US 2021/0013691 A1   Jan. 14, 2021

Related U.S. Application Data

(60) Provisional application No. 62/872,807, filed on Jul. 11, 2019.

(51) Int. Cl.
*H01S 3/10*   (2006.01)
*H01S 3/08*   (2006.01)
(Continued)

(52) U.S. Cl.
CPC ......... *H01S 3/08022* (2013.01); *G01N 21/55* (2013.01); *H01S 3/005* (2013.01);
(Continued)

(58) Field of Classification Search
CPC ............. H01S 3/08022; H01S 3/10061; H01S 3/0014; H01S 3/005; H01S 3/11; H01S 2301/20
See application file for complete search history.

(56) References Cited

U.S. PATENT DOCUMENTS 3,509,487 A  *  4/1970  Bouwhuis ............... H01S 3/102
                                                         372/27
6,898,216 B1 * 5/2005  Kleinschmidt ........ G02B 27/48
                                                         372/99

(Continued)

OTHER PUBLICATIONS

Lachapelle, A., "High field physics at ALLS," Proc. SPIE 9515, Research Using Extreme Light: Entering New Frontiers with Petawatt-Class Lasers II, 95150B (May 1, 2015).

(Continued)

*Primary Examiner* — Kinam Park
(74) *Attorney, Agent, or Firm* — Lavery, De Billy, LLP; Gwendoline Bruneau (57) ABSTRACT

A method and a system for measurement of high laser field intensity, the method comprising tight focusing a non-Gaussian azimuthally polarized laser mode beam to a focusing spot, measuring a spectral line shape of a selected ionization state induced by a longitudinal oscillating magnetic field created by the tight focusing in the focusing spot; and determining the laser intensity from the spectral line shape. The system comprises a laser source of a peak power in a range between 100 terawatt and 10 petawatt; a converter unit; a tight focusing optics; and spectral measurement means; wherein the converter unit polarizes a main laser beam from the laser source into a non-Gaussian azimuthally polarized laser mode beam; the tight focusing optics focuses the azimuthally polarized laser mode beam to a focusing spot, yielding a longitudinal oscillating magnetic field of an intensity proportional to the laser intensity, the spectral measurement means measuring a line shape of a selected ionization state induced by the longitudinal oscillating magnetic field in focusing spot.

20 Claims, 5 Drawing Sheets

(51) Int. Cl.
*G01N 21/55* (2014.01)
*H01S 3/00* (2006.01)
*H01S 3/11* (2006.01)

(52) U.S. Cl.
CPC ........ *H01S 3/0014* (2013.01); *H01S 3/10061* (2013.01); *H01S 3/11* (2013.01); *H01S 2301/20* (2013.01)

(56) References Cited

U.S. PATENT DOCUMENTS

| 8,558,199 | B2 | 10/2013 | Payeur et al. | |
|---|---|---|---|---|
| 2013/0161539 | A1* | 6/2013 | Payeur | H01J 35/02 |
| | | | | 250/493.1 |
| 2014/0168755 | A1* | 6/2014 | Clowes | H01S 3/067 |
| | | | | 359/341.1 |
| 2015/0377997 | A1* | 12/2015 | Zabow | A61K 49/1818 |
| | | | | 324/309 |
| 2021/0219410 | A1* | 7/2021 | Fourmaux | H05G 2/008 |

OTHER PUBLICATIONS

O. Peyrusse, "Spectral line-shape calculations for multielectron ions in hot plasmas submitted to a strong oscillating electric field", Phys. Rev. A 79, 013411 (2009).
Stambulchik, E., et al., "Zeeman Effect Induced by Intense Laser Light", Phys. Rev. Lett. 113, 083002 (2014).
Briand, J., et al, Measurements of magnetic fields using the Zeeman effect in laser-produced plasmas, The Physics of Fluids 30, 2893 (1987).

* cited by examiner

FIG. 5

METHOD AND SYSTEM FOR MEASUREMENT OF ULTRA-HIGH LASER INTENSITY

CROSS REFERENCE TO RELATED APPLICATIONS

This application claims benefit of U.S. provisional application Ser. No. 62/872,807, filed on Jul. 11, 2019. All documents above are incorporated herein in their entirety by reference.

FIELD OF THE INVENTION

The present invention relates to laser intensity measurements at high intensity. More specifically, the present invention is concerned with a method and system for measurement of ultra-high laser intensity.

BACKGROUND OF THE INVENTION

Recent developments in laser technology have brought ultra-high intensity laser matter interaction to a new level. It is now possible to reach unprecedented optical field strength and radiation is becoming a key dominant feature of laser matter interaction and matter dynamics at intensities well above the relativistic threshold. There is a huge effort worldwide to study physics in this high field domain because high intensity laser-matter interaction allows the exploration of novel relativistic plasmas effects with applications ranging from particle accelerators to laboratory astrophysics.

Developments at higher and higher laser intensities are underway in order to produce very hot dense plasmas and explore regimes in which the plasma dynamics is modified by field effects. Exploration of high laser field effects and laser-produced plasmas at intensities in the $10^{22}$ W/cm$^2$-$10^{23}$ W/cm$^2$ range, typically near quantum electrodynamic (QED) regime, and beyond, in pure quantum electrodynamic (QED) regime, requiring intensity well above $10^{23}$ W/cm$^2$, remains a challenge.

A challenge is to measure the laser intensity effectively reached on a given target inside the focal spot, experimentally and in-situ.

In laser-produced plasmas experiments, a plurality of different physical processes, which are in a different way intensity dependent, compete at different densities and times in the interaction area. Measurables, such as photons or particles, generated by a given process in a large volume outside the main focal spot and before the peak of the pulse can mask the observation of same measurables but produced by some other particular process localized inside the very small spot where the highest intensity is achieved. With short focal length optics, of numerical aperture close to 1, used to achieve ultra-high intensities, the spatial intensity profile of the beam in the focal plane and the temporal intensity profile, in particular the pulse rise-time, induce signal mixing from different interaction volumes and temporal overlaps, precluding a unequivocal determination of intensity or a scaling law relating a particular physical process to the intensity variation [1].

A few methods, based on emission characteristics of Compton scattering or scaling law of Laser Wakefield based betatron radiation, have been demonstrated for long focusing optics and intensities lower than $10^{21}$ W/cm$^2$. Based on the localization of an interaction process and the specificity of the resulting measurable directly related to the interaction zone and to the intensity, these methods are not applicable with extremely short focal length focusing optics used to achieve intensities above $10^{21}$ W/cm$^2$.

Two methods have been proposed so far for intensity measurements at higher intensity. A first one is based on the measurements of all the laser pulse parameters, including phase front, energy and pulse duration, in the focal plane. A second method comprises using measurements of ionization states as a function of the laser energy. However, both methods have a low specificity or sensibility. The former one has been realized without interaction with a target and with relatively low energy beam. The latter one is lacking sensibility since a given ionization state can exist for a range of intensities.

There is still a need for a method for the measurement of laser intensity measurements at high intensity.

The present description refers to a number of documents, the content of which is herein incorporated by reference in their entirety.

SUMMARY OF THE INVENTION

More specifically, in accordance with the present invention, there is provided a method for measurement of high laser field intensity, comprising tight focusing a non-Gaussian azimuthally polarized laser mode beam to a focusing spot, measuring a spectral line shape of a selected ionization state induced by a longitudinal oscillating magnetic field created by the tight focusing in the focusing spot; and determining the laser intensity from the spectral line shape.

There is further provided a system for measurement of high laser field intensity, comprising a laser source of a peak power in a range between 100 terawatt and 10 petawatt; a converter unit; a tight focusing optics; and spectral measurement means; wherein the converter unit polarizes a main laser beam from the laser source into a non-Gaussian azimuthally polarized laser mode beam; the tight focusing optics focuses the azimuthally polarized laser mode beam to a focusing spot, yielding a longitudinal oscillating magnetic field of an intensity proportional to the laser intensity, the spectral measurement means measuring a line shape of a selected ionization state induced by the longitudinal oscillating magnetic field in focusing spot.

There is further provided a method for measuring ultra-high laser intensity, comprising generating a longitudinal oscillating magnetic field of an intensity proportional to the laser intensity in a focusing point of highest intensity by tight focusing a non-Gaussian azimuthally polarized laser mode beam, measuring a line shape of a selected ionization state e induced by the longitudinal oscillating magnetic field in the focusing spot, and determining the laser intensity from the spectral line shape.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 is a schematic view of interaction of an auxilliary beam with a thin foil target positioned in the focal plane of the TE$_{01}$ beam, before arrival of the TE$_{01}$ beam;

DESCRIPTION OF ILLUSTRATIVE EMBODIMENTS

The present invention is illustrated in further details by the following non-limiting examples.

In a nutshell, the method comprises tight focusing a non-Gaussian $TE_{01}$ mode (azimuthally polarized) and measuring the spectral line shape of a selected ionization state in the highest intensity spot. The method comprises simultaneous localization of a physical process in the highest intensity area, thereby yielding high specificity of measurables, such as photons or particles, generated by the physical process inside a very small spot where the highest intensity is achieved.

Figure 1:
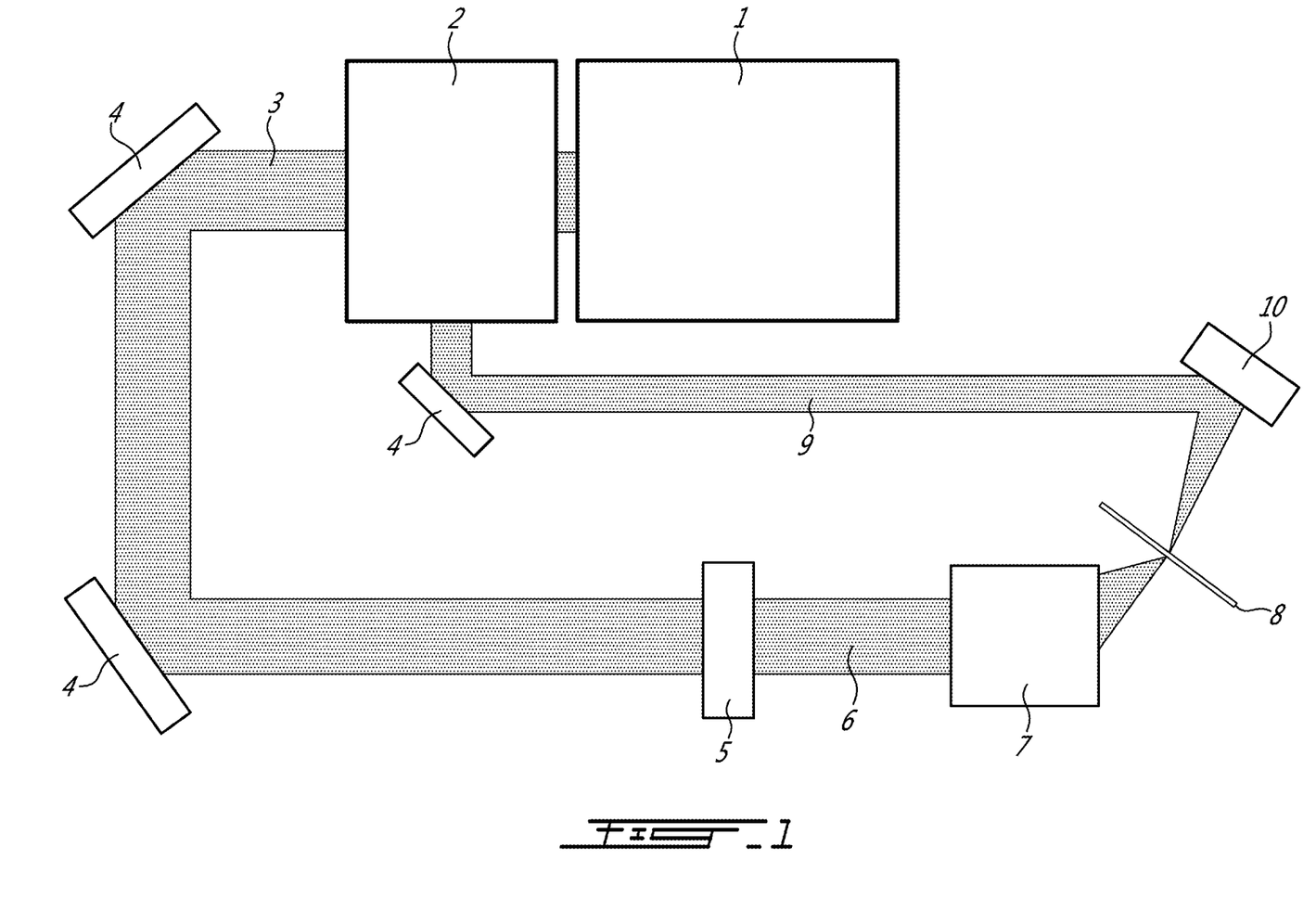
FIG. 1 is a schematic view of a system according to an embodiment of an aspect of the present disclosure.

FIG. 1 illustrates a system according to an embodiment of an aspect of the present disclosure. The illustrated system comprises a high peak power laser source 1 and a tight focusing optics 7, an optical compressor 2, mirrors 4, and a polarization converter unit 5 such as a beam shaper. The laser source 1 has a peak power in a range between about 100 terawatt and about 10 petawatt (PW). The tight focusing optics 7 is a high numerical aperture (HNA) reflective optics such as an on-axis parabola having a numerical aperture close to 1, in a range between about 0.7 and 1, or a combination of a parabolic mirror and an ellipsoid plasma mirror for example. A high energy laser pulse, in a range between about 1 J and about 1 kJ is thus tight-focused to a spot having a size in the range of the laser wavelength, in a range between about 400 nm and about 2 μm.

The main laser beam 3 is first polarized into an azimuthally polarized $TE_{01}$ mode 6 by the beam shaper 5. The azimuthally polarized $TE_{01}$ mode 6 is then focused by the tight focusing optics 7 in the spot of highest energy, and thus intensity, with an intensity comprised in a range between about $10^{22}$ W/cm$^2$ and about $10^{23}$ W/cm$^2$, thereby creating in the focal plane 8 a very intense longitudinal oscillating magnetic field 12, proportional to the laser intensity which is in a range between about $10^{21}$ W/cm$^2$ and about $10^{23}$ W/cm$^2$. Thus, the longitudinal oscillating magnetic field 12 is very intense, in a range between about 10 kT and about 500 kT, depending on parameters such as the laser wavelength, the laser energy and the pulse duration (see FIG. 2).

In turn, this strong oscillating magnetic field 12 produces a strong Zeeman effect in the region of highest intensity 8 [2,3]. The method comprises measuring the line shape induced by the oscillating magnetic field in the gas target in this region, using a high-resolution spectrometer for example (not shown in FIG. 1), and determining the laser intensity from the measurement of the different polarization components inside the line shape, the separation between these components being directly related to the longitudinal magnetic field strength and thus to the laser intensity.

Even in presence of a large ionization volume due to spatial intensity distribution and with rise-time longer than the full width at half maximum (FWHM) of the pulse, the longitudinal magnetic field and its related measurable Zeeman effect are localized and exist only at the point and the time of the highest intensity. Other magnetic fields, such as static magnetic fields, may be generated during laser-matter interaction in various part of the plasma: for example, a toroidal magnetic field may be created by cross density and temperature gradient; and/or an axial magnetic field may be generated by dynamo effects [4]. However, the magnitude of such magnetic fields remains very low compared to the magnetic field of the longitudinal field created by tight focusing the $TE_{01}$ mode as described hereinabove, and their field effects have lower magnitude. Thus, the measurement of the line shape induced by the oscillating magnetic field created by tight focusing the $TE_{01}$ mode is a signature of the area of highest volume and a very high sensibility to the laser intensity variation since the spectrum changes as a function of the laser intensity.

In an embodiment according to the present disclosure, the method further comprises precise localization of the ionization volume, by selecting and combining a PW laser with HNA focusing optics and a $TE_{01}$ laser beam to produce a strong longitudinal magnetic field. The measurement of the Zeeman effect in the focal spat of the HNA optics is then used to obtain the laser intensity. Indeed, even if the Zeeman effect is localized to the highest field region, the propagation of the laser beam before reaching the focal plane may be affected by a large ionization volume inducing some undesirable non-linear effects and beam distortion in the highest field region. Thus in addition to the localization of the Zeeman effect, the method comprises localization of the ionization volume, thereby improving the signature of the beam intensity in the focal plane, i. e. in the highest intensity region.

As shown in FIG. 1, a short-pulse auxiliary beam 9, of a pulse in a range between about 10 fs and about 30 fs, perfectly synchronized with the main laser beam 3, is derived from the main laser beam 3 before polarization shaping of the main laser beam 3. The auxiliary beam 9 is focused with an intensity in a range between about $10^{14}$ W/cm$^2$ and $10^{15}$ W/cm$^2$ on a thin foil target 13 precisely located at the focal plane 8 of the $TE_{01}$ beam 6, by auxiliary focusing optics 10. The auxiliary focusing optics 10 may be an off-axis parabola for example. The thin foil target 13 has a thickness in a range between about 10 mm and about 50 mm; it may be a solid density 30 nm-thick CH foil for example. Other materials, with higher atomic number, may be considered for the thin foil target 13.

Figure 2:
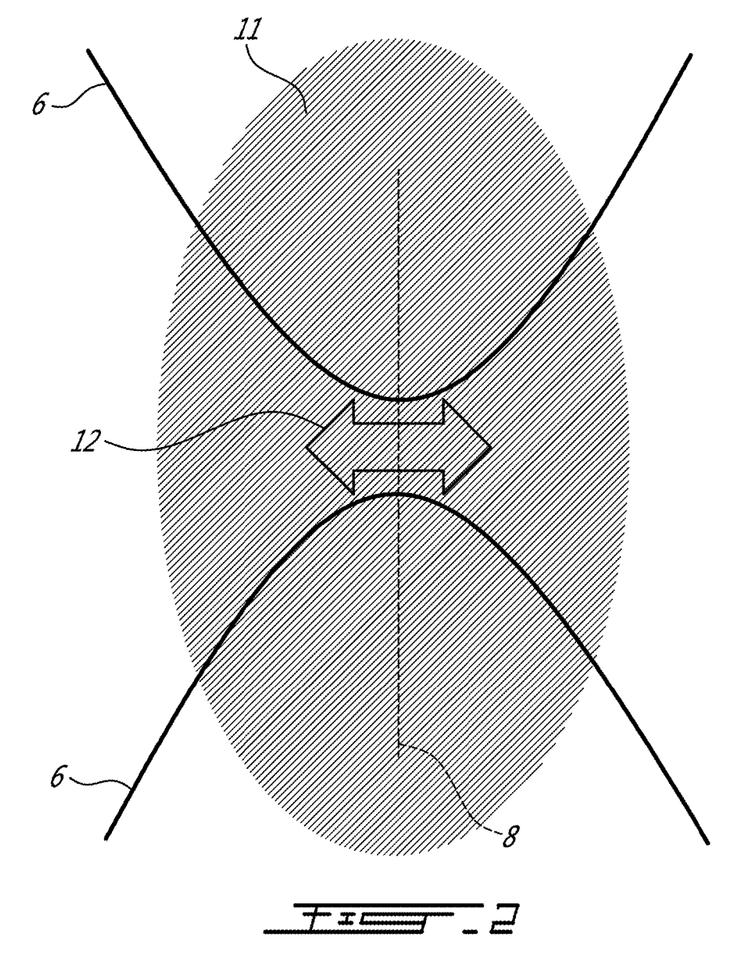
FIG. 2 is a schematic view of interaction of a 5TE$_{01}$ beam with a gas target at the focusing focal point.
Figure 4:
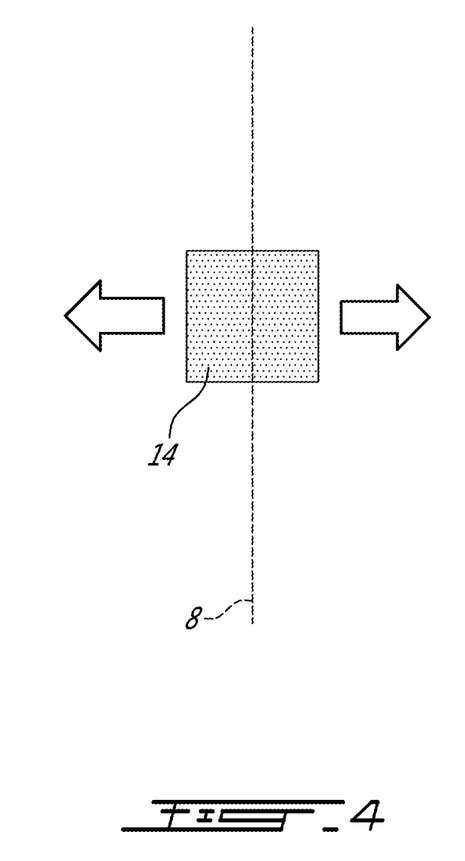
FIG. 4 is a schematic view of a heat-generated gas target due to the interaction between the auxilliary beam with the thin foil target.
Figure 5:
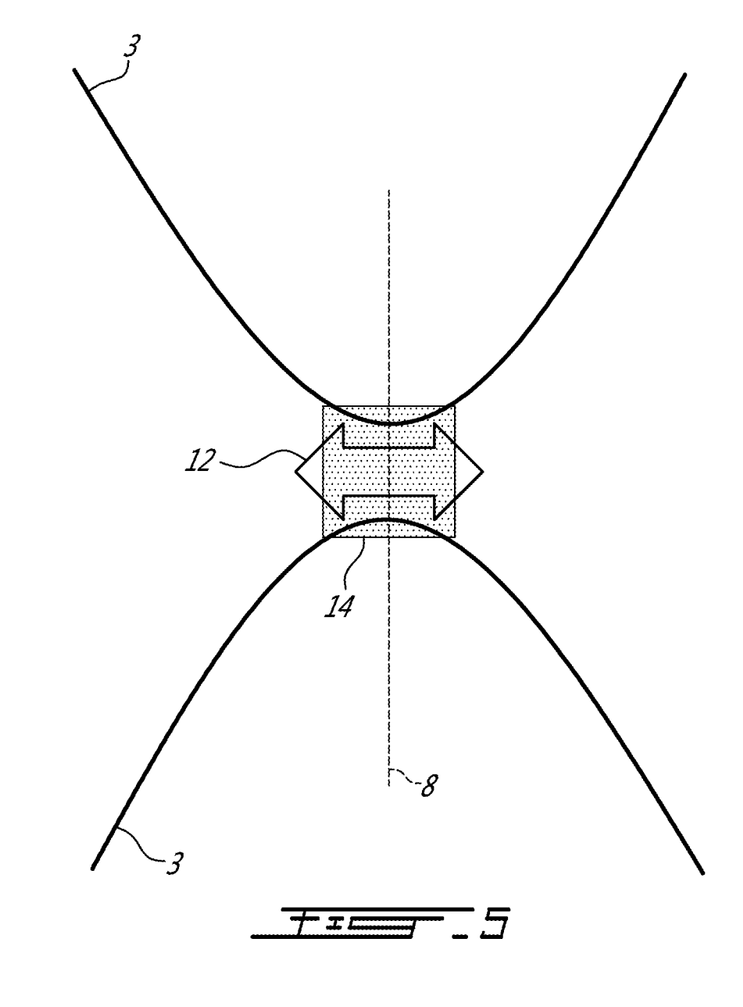
FIG. 5 is a schematic view of interaction of the $TE_{01}$ beam with the gas target of FIG. 4.
Figure 7:
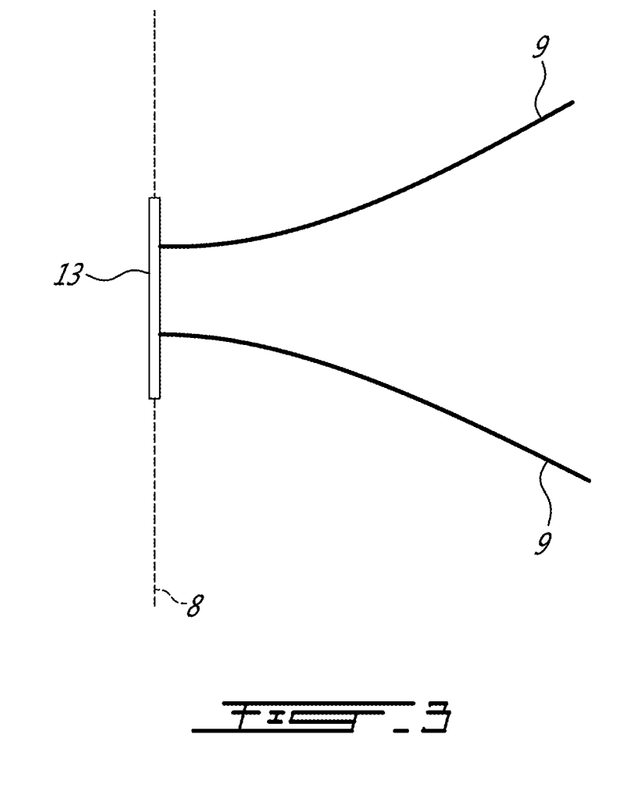

As a result, a warm dense plasma having a temperature in a range between about 30 eV and about 60 eV is generated exactly in the focal plane 8 of the $TE_{01}$ beam 6. This plasma then decompresses into a very localized, low density plasma. Decompression of the plasma occurs slowly, at a rate in a range between about $10^6$ cm/s and about $10^7$ cm/s (i.e. in a range between about 10 nm/picosecond and about 100 nm/picosecond) giving way, after a delay in a range between about 5 ps and about 20 ps, to a plasma, localized in a thickness in a range between about 300 nm and about 1 μm from either side of the plane 8 of the $TE_{01}$ beam. This localized resulting plasma is a low density plasma. i. e. less than the critical density $n_c$ (FIG. 4), in a range from $n_c/10$ to $n_c$. The $TE_{01}$ beam 6 can thus propagate without distortion and induce the Zeeman effect. In FIGS. 2 and 5, the arrow indicates the axis and position of the magnetic field. FIG. 3 shows interaction of the auxilliary beam 9 with the thin foil target 13 positioned in the focal plane 8 of the $TE_{01}$ beam, after the plasma decompression delay before arrival of the $TE_{01}$ beam, and FIG. 4 is a schematic view of the heat-generated gas target 14 resulting from this interaction.

In preliminary experiments in the $10^{19}$-$10^{22}$ W/cm$^2$ intensity range, $TM_{01}$ (radial polarization) and $TE_{01}$ (azimuthal polarization) modes produced with a 200 TW system (2 J, 30 fs pulse, 8 cm diameter beam) were successfully used with high numerical aperture (HNA) (0.7-1) on-axis parabola and gas targets. During the laser-target interaction, the atomic physics, typically ionization dynamics and equilibrium, of the very hot electric and dense plasmas produced in regimes where very high electric and magnetic oscillating fields are key parameters, were characterized with high resolution X-ray spectroscopy, including time-resolved X-ray absorption spectroscopy. Spectral line shapes emitted by plasmas at intensities below $10^{19}$ W/cm$^2$ were analyzed.

As people in the art will appreciate, laser intensity measurements at high intensity are thus obtained with high specificity. The present method and system may be used with very intense laser pulse having spatial and temporal effects, such as radial intensity distribution in the focal plane due to the spatial pulse shape and long rise time due to the limits of the chirped pulse amplification (CPA) recompression method at the fundamental frequency, or of other amplification, frequency conversion and compression methods such as optical parametric chirped pulse amplification (OPCPA) and post-pulse compression methods.

The scope of the claims should not be limited by the embodiments set forth in the examples, but should be given the broadest interpretation consistent with the description as a whole.

REFERENCES

[1] A. Lachapelle et al, Proc. of SPIE, G. Korn and L. O Silva eds, Vol 9515, 95150B1 (2015).
[2] O. Peyrusse, Phys. Rev. A 79, 013411 (2009).
[3] E. Stambulchik et al, Phys. Rev. Lett. 113, 083002 (2014).
[4] J. Briand et al, Phys. Fluids 30, 2893 (1987)

The invention claimed is:

1. A method for measurement of high laser field intensity, comprising tight focusing a non-Gaussian azimuthally polarized laser mode beam to a focusing spot, measuring a spectral line shape of a selected ionization state induced by a longitudinal oscillating magnetic field created by said tight focusing in the focusing spot; and determining the laser intensity from the spectral line shape.

2. The method of claim 1, comprising selecting a high peak power laser source; polarizing a main laser beam into an azimuthally polarized $TE_{01}$ mode; focusing the azimuthally polarized $TE_{01}$ mode in the focusing spot having a size in a range between about 400 nm and about 2 μm with an intensity comprised in a range between about $10^{22}$ W/cm$^2$ and $10^{23}$ W/cm$^2$.

3. The method of claim 1, comprising selecting a laser source laser source of a peak power in a range between 100 terawatt and 10 petawatt; selecting a high numerical aperture optics; polarizing a main laser beam into an azimuthally polarized $TE_{01}$ mode; focusing the azimuthally polarized $TE_{01}$ mode in the focusing spot with an intensity comprised in a range between $10^{22}$ W/cm$^2$ and $10^{23}$ W/cm$^2$.

4. The method of claim 1, wherein the laser intensity is in a range between $10^{21}$ W/cm$^2$ and $10^{23}$ W/cm$^2$ and the longitudinal oscillating magnetic field has an intensity in a range between 10kT and 500kT.

5. The method of claim 1, comprising focusing an auxiliary beam derived from a main laser beam on a thin foil target located at the focal plane of the non-Gaussian azimuthally polarized laser mode beam.

6. The method of claim 1, comprising focusing an auxiliary beam derived from a main laser beam on a foil target of a thickness in a range between about 10 mm and about 50 mm located at the focal plane of the non-Gaussian azimuthally polarized laser mode beam.

7. The method of claim 1, comprising focusing an auxiliary beam derived from a main laser beam on a thin foil target located at the focal plane of the non-Gaussian azimuthally polarized laser mode beam, thereby yielding a plasma localized in a thickness in a range between 300 nm and 1 μm from either side of the focal plane of the non-Gaussian azimuthally polarized laser mode beam and of a density less than the critical density $n_c$.

8. The method of claim 1, comprising focusing an auxiliary beam derived from a main laser beam on a thin foil target located at the focal plane of the non-Gaussian azimuthally polarized laser mode beam, thereby yielding a plasma localized in a thickness in a range between 300 nm and 1 μm from either side of the focal plane of the non-Gaussian azimuthally polarized laser mode beam and of a density in a range between $n_c/10$ and $n_c$, where $n_c$, is the critical density.

9. A system for measurement of high laser field intensity, comprising:
   a laser source of a peak power in a range between 100 terawatt and 10 petawatt;
   a converter unit;
   a tight focusing optics; and
   spectral measurement means;
   wherein said converter unit polarizes a main laser beam from the laser source into a non-Gaussian azimuthally polarized laser mode beam; said tight focusing optics focuses the azimuthally polarized laser mode beam to a focusing spot, yielding a longitudinal oscillating magnetic field of an intensity proportional to the laser intensity, said spectral measurement means measuring a line shape of a selected ionization state induced by the longitudinal oscillating magnetic field in focusing spot.

10. The system of claim 9, wherein the azimuthally polarized laser mode beam is a laser pulse of energy in a range between 1J and 1 kJ.

11. The system of claim 9, wherein the tight focusing optics is a high numerical aperture reflective optics.

12. The system of claim 9, wherein the tight focusing optics has a numerical aperture in a range between 0.7 and 1.

13. The system of claim 9, wherein the tight focusing optics is a combination of a parabolic mirror and an ellipsoid plasma mirror of a numerical aperture in a range between 0.7 and 1.

14. The system of claim 9, wherein the focal point of the tight focusing optics has an intensity comprised in a range between $10^{22}$ W/cm$^2$ and $10^{23}$ W/cm$^2$.

15. The system of claim 9, wherein the laser intensity is in a range between $10^{21}$ W/cm$^2$ and $10^{23}$ W/cm$^2$.

16. The system of claim 9, wherein the longitudinal oscillating magnetic field has an intensity in a range between 10kT and 500kT.

17. The system of claim 9, further comprising auxiliary focusing optics and a thin foil target located at the focal plane of the azimuthally polarized laser mode beam, said auxiliary focusing optics focusing an auxiliary beam derived from the main laser beam, of a pulse in a range between 10fs and 30fs, synchronized with the main laser beam, to the thin foil target.

18. The system of claim 9, further comprising an auxiliary focusing optics and a foil target located at the focal plane of the azimuthally polarized laser mode beam, said auxiliary focusing optics focusing an auxiliary beam derived from the main laser beam, of a pulse in a range between 10fs and 30fs, synchronized with the main laser beam, to the foil target; wherein the auxiliary focusing optics is an off-axis parabola.

19. The system of claim 9, further comprising an auxiliary focusing optics and a foil target located at the focal plane of the azimuthally polarized $TE_{01}$ mode, said auxiliary focusing optics focusing an auxiliary beam derived from the main laser beam, of a pulse in a range between 10fs and 30fs, synchronized with the main laser beam, to the foil target; wherein the foil target has a thickness in a range between 10 mm and 50 mm.

20. A method for measuring ultra-high laser intensity, comprising generating a longitudinal oscillating magnetic field of an intensity proportional to the laser intensity in a focusing point of highest intensity by tight focusing a non-Gaussian azimuthally polarized laser mode beam, measuring a line shape of a selected ionization state induced by the longitudinal oscillating magnetic field in the focusing spot, and determining the laser intensity from the spectral line shape.

* * * * *